United States Patent
Verwillow et al.

(10) Patent No.: US 8,923,301 B1
(45) Date of Patent: *Dec. 30, 2014

(54) FIXED LATENCY PRIORITY CLASSIFIER FOR NETWORK DATA

(71) Applicant: Juniper Networks, Inc., Sunnyvale, CA (US)

(72) Inventors: Eric M. Verwillow, Palo Alto, CA (US); Jean-Marc Frailong, Los Altos Hills, CA (US); Avanindra Godbole, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/091,600

(22) Filed: Nov. 27, 2013

Related U.S. Application Data

(63) Continuation of application No. 13/338,595, filed on Dec. 28, 2011, now Pat. No. 8,681,795.

(51) Int. Cl.
| | | |
|---|---|---|
| *H04L 12/54* | (2013.01) | |
| *H04L 12/863* | (2013.01) | |
| *H04L 12/741* | (2013.01) | |

(52) U.S. Cl.
CPC ............ *H04L 47/6215* (2013.01); *H04L 45/74* (2013.01)
USPC ............................ 370/392; 370/412; 370/474

(58) Field of Classification Search
CPC . H04L 47/6215; H04L 45/74; H04L 49/3009; H04L 12/54; H04L 69/22; H04L 69/04; H04L 45/7453; H04L 47/2441
USPC ......... 370/229, 230, 235, 252, 351, 357, 359, 370/360–365, 389, 392, 395.42, 412, 470, 370/471, 472, 474; 709/240
See application file for complete search history.

(56) References Cited

U.S. PATENT DOCUMENTS

| | | | |
|---|---|---|---|
| 6,633,565 B1 | 10/2003 | Bronstein et al. | |
| 6,760,345 B1 | 7/2004 | Rosengard | |
| 6,778,530 B1 | 8/2004 | Greene | |
| 6,967,964 B1 * | 11/2005 | Svanbro et al. | 370/437 |
| 7,372,843 B1 * | 5/2008 | Asawa et al. | 370/349 |
| 7,460,516 B1 * | 12/2008 | Smith et al. | 370/349 |
| 7,613,209 B1 | 11/2009 | Nguyen et al. | |

(Continued)

OTHER PUBLICATIONS

Co-Pending U.S. Appl. No. 13/338,595, filed Dec. 28, 2011, entitled "Fixed Latency Priority Classifier for Network Data" by Eric M. Verwillow et al., 34 pages.

*Primary Examiner* — Ahmed Elallam
(74) *Attorney, Agent, or Firm* — Harrity & Harrity, LLP

(57) ABSTRACT

A network device may receive a packet including control tags in a header portion of the packet and may extract candidate tags from the control tags in the header portion of the packet. The network device may compress, using a first lookup table, the candidate tags to obtain keys corresponding to the candidate tags, where each of the keys is represented in a compressed format relative to the corresponding candidate tags. The network device may further determine a final key based on the first keys and determine a priority class for the packet based on a lookup operation of the final key into a second lookup table. The network device may further write the packet, or a reference to the packet, to a selected priority queue, of a number of priority queues, where the priority queue is selected based on the determined priority class.

20 Claims, 7 Drawing Sheets

(56) References Cited

U.S. PATENT DOCUMENTS

| | | |
|---|---|---|
| 7,643,505 B1 | 1/2010 | Colloff |
| 7,827,218 B1 | 11/2010 | Mittal |
| 8,195,873 B2 | 6/2012 | Gazit |
| 8,224,980 B2 | 7/2012 | Rosu |
| 8,356,020 B2 | 1/2013 | Mittal |
| 8,462,786 B2 * | 6/2013 | Liu et al. .................. 370/392 |
| 8,522,348 B2 * | 8/2013 | Chen et al. ................. 726/23 |
| 8,572,140 B1 * | 10/2013 | Mittal ........................ 707/899 |
| 8,681,795 B1 * | 3/2014 | Verwillow et al. ......... 370/392 |
| 8,711,883 B2 * | 4/2014 | Kang et al. ................. 370/477 |
| 2006/0059196 A1 | 3/2006 | Sato et al. |
| 2008/0049774 A1 | 2/2008 | Swenson et al. |
| 2010/0238922 A1 | 9/2010 | Sundstrom |

* cited by examiner

US 8,923,301 B1

FIXED LATENCY PRIORITY CLASSIFIER FOR NETWORK DATA

RELATED APPLICATION

This application is a continuation of U.S. patent application Ser. No. 13/338,595 filed Dec. 28, 2011, which is incorporated herein by reference.

BACKGROUND

Computing and communication networks typically include nodes, such as routers, firewalls, switches or gateways, which transfer or switch data, such as packets, from one or more sources to one or more destinations. The nodes may operate on the packets as the packets traverse the network, such as by forwarding or filtering network traffic defined by the packets.

Ethernet is a common network technology that is used by nodes in forwarding network traffic. In an Ethernet connection, nodes may divide a stream of data into individual packets called frames. Each frame may contain, in addition to the substantive payload data that is to be transmitted by the frame, header information, such as source and destination addresses, priority or control information, and error-checking data. The header information may particularly include one or more tags that provide control information relating to the priority classification of the frame. Higher priority frames may be given preference, relative to lower priority frames, when being processed by a node.

The number and size of the tags in a frame may vary. In order to determine the priority classification for a frame, the tags in the frame may be parsed, where the relative order of the tags in the frame may be relevant to the determination of the priority classification. For high bandwidth applications, it may be important to be able to quickly determine the priority classification for a frame.

SUMMARY

According to one aspect, method may include receiving a packet including control tags in a header portion of the packet; extracting candidate tags from the control tags in the header portion of the packet; compressing, using a first lookup table, the candidate tags to obtain a corresponding first quantity of keys corresponding to the candidate tags, where each of the first quantity of keys is represented in a compressed format relative to the corresponding candidate tags; determining a final key based on the first quantity of keys; determining a priority class for the packet based on a lookup operation of the final key using a second lookup table; and writing, by the device, the packet or a reference to the packet, to a selected priority queue, of a quantity of priority queues, where the priority queue is selected based on the determined priority class.

According to another aspect, a device may include a tag extraction component to receive a packet including control tags in a header portion of the packet, and to extract candidate tags from the control tags; a first compression component to compress, in parallel, the candidate tags, to obtain a corresponding first quantity of keys corresponding to the candidate tags, where each of the first quantity of keys is represented in a compressed format relative to the corresponding candidate tags; a second compression component to further compress, in parallel, the first quantity of keys to obtain a second quantity of keys; and a classification lookup component to determine a priority class for the packet based on a lookup, into a lookup table, using a particular quantity of the second quantity of keys.

According to another aspect, a network device may include ports to receive network traffic as packets, at least some of the packets including control tags in header portions of the packets; and a switching mechanism to process the received network traffic. The switching mechanism may include a tag extraction component to receive the packets and to extract candidate tags from the control tags; a first compression component to compress, in parallel, the candidate tags, to obtain a corresponding first quantity of keys corresponding to the tags, where each of the first quantity of keys is represented in a compressed format relative to the corresponding candidate tags; a second compression component to further compress, in parallel, the first quantity of keys to obtain a second quantity of keys; and a classification lookup component to determine a priority class for the packet based on a lookup, into a lookup table, using a particular quantity of the second quantity of keys.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods, described herein, may enable a network node to determine a priority classification for a packet, such as an Ethernet frame, using a fixed latency priority determination technique. The priority classification may be implemented as a multi-stage pipeline. The pipeline stages may include stages in which tags in the header of the packet are compressed, in parallel. The final compressed version of the tags may be used as a key to a lookup table that may directly return the priority classification of the packet.

Based on the determined priority classification, the packet may be added to an appropriate per-priority queue for further processing, such as processing of the packet to forward it to a correct output port.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data. An Ethernet packet, which may also commonly be referred to as a frame, will be referenced for the implementations described herein. The concepts described herein may broadly be applied to other, non-Ethernet, network and/or communication technologies.

Figure 1:
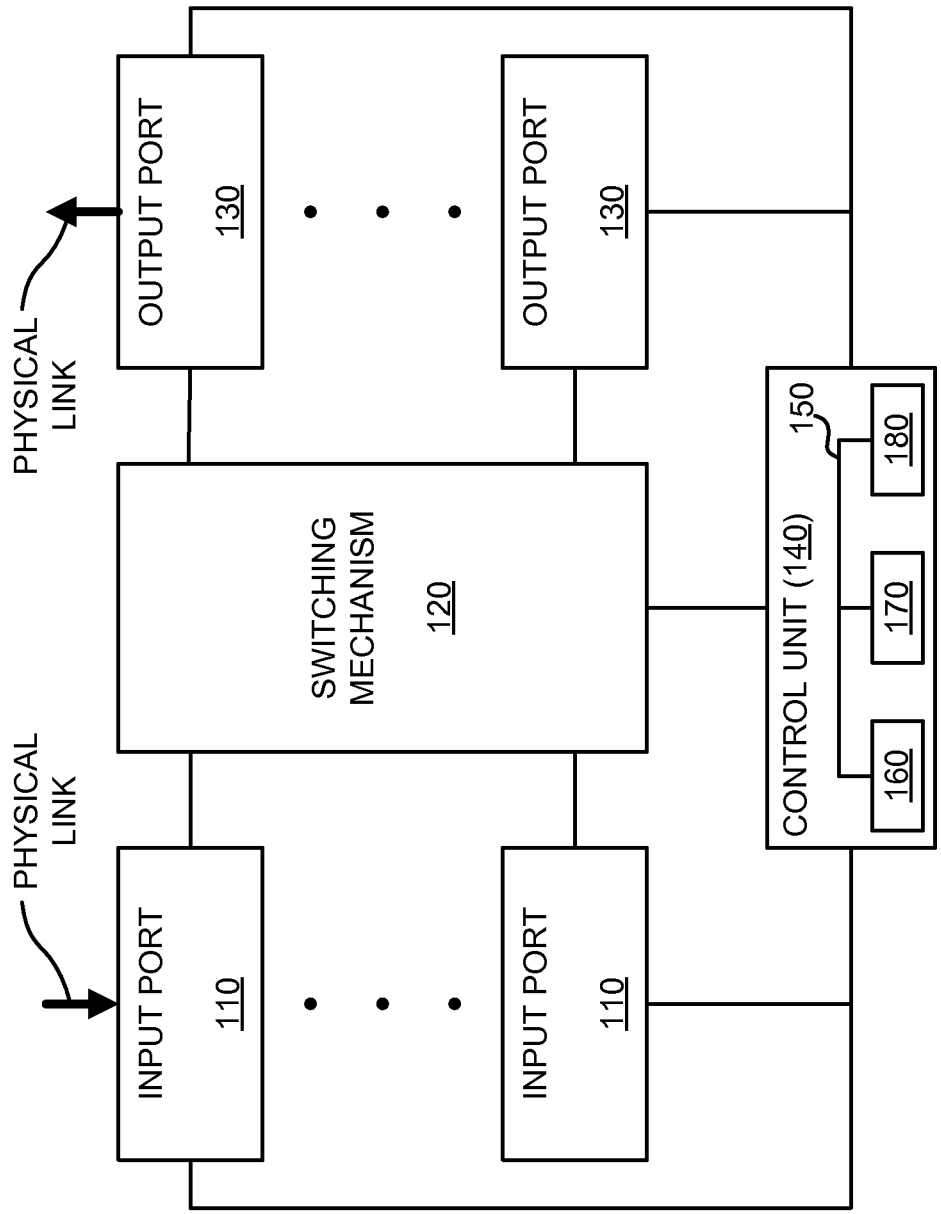
FIG. 1 is a diagram of example components of a device that may correspond to a network device or node.

FIG. 1 is a diagram of example components of a device 100 that may correspond to a network device or node. Device 100 may be, for example, a router, a switch, a firewall, a network security device, or another device, that routes and/or forwards packets. For example, device 100 may include a high capacity switch or router to forward Ethernet packets to other nodes in a network. In some implementations, device 100 may be a component, such as a chip or a card, in a larger device. For example, device 100 may be a card in a router and may forward packets to other network nodes or to other cards in the router. As shown in FIG. 1, device 100 may include input ports 110, a switching mechanism 120, output ports 130, and a control unit 140.

Input ports 110 may be a point of attachment for physical links and may be a point of entry for incoming traffic, such as packets. Input ports 110 may carry out data link layer encapsulation and decapsulation.

Switching mechanism 120 may connect input ports 110 with output ports 130. Switching mechanism 120 may generally provide the data plane path, for device 100, between input ports 110 and output ports 130. In other words, switching mechanism 120 may perform functions relating to the processing of packets received at device 100. Switching mechanism 120 may be implemented using many different techniques. For example, switching mechanism 120 may be implemented via busses, crossbars, application specific integrated circuits (ASICs), and/or with shared memories which may act as temporary buffers to store traffic, from input ports 110, before the traffic is eventually scheduled for delivery to output ports 130.

In general, switching mechanism 120 may store packets and may schedule packets for delivery on output physical links. Switching mechanism 120 may include scheduling algorithms that support priorities and guarantees. Switching mechanism 120 may support data link layer encapsulation and decapsulation, and/or a variety of higher-level protocols. Switching mechanism 120 will be described in more detail below.

Output ports 130 may be a point of attachment for physical links and may be a point of egress for outgoing traffic. Output ports 110 may carry out data link layer encapsulation and decapsulation. The designation of whether a port is an input port 110 or output port 130 may be arbitrary. A port may function as either an input port or an output port.

Control unit 140 may implement routing protocols and/or switching protocols to generate one or more routing and/or forwarding tables, such as tables that may be used by switching mechanism 120. Control unit 140 may generally represent the control plane for device 100. Control unit 140 may connect with input ports 110, switching mechanism 120, and output ports 130. Control unit 140 may also run software to configure and manage device 100.

In an example implementation, control unit 140 may include a bus 150 that may include a path that permits communication among a processor 160, a memory 170, and a communication interface 180. Processor 160 may include one or more processors, microprocessors, ASICs, field-programmable gate arrays (FPGAs), or other types of processing units that interpret and execute instructions. Memory 170 may include a random access memory (RAM), a read only memory (ROM) device, a magnetic and/or optical recording medium and its corresponding drive, and/or another type of static and/or dynamic storage device that may store information and instructions for execution by processor 160. Communication interface 180 may include any transceiver-like mechanism that enables control unit 140 to communicate with other devices and/or systems.

Device 100 may perform certain operations, as described herein. Device 100 may perform these operations in response to processor 160 executing software instructions contained in a computer-readable medium, such as memory 170. A computer-readable medium may be defined as a non-transitory memory device. A memory device may include space within a single physical memory device or spread across multiple physical memory devices. The software instructions may be read into memory 170 from another computer-readable medium, such as a data storage device, or from another device via communication interface 180. The software instructions contained in memory 170 may cause processor 160 to perform processes described herein. Alternatively, hardwired circuitry may be used in place of or in combination with software instructions to implement processes described herein. Thus, implementations described herein are not limited to any specific combination of hardware circuitry and software.

Although FIG. 1 shows example components of device 100, in other implementations, device 100 may include fewer components, different components, differently arranged components, or additional components than depicted in FIG. 1. Alternatively, or additionally, one or more components of device 100 may perform one or more other tasks described as being performed by one or more other components of device 100.

Figure 2:
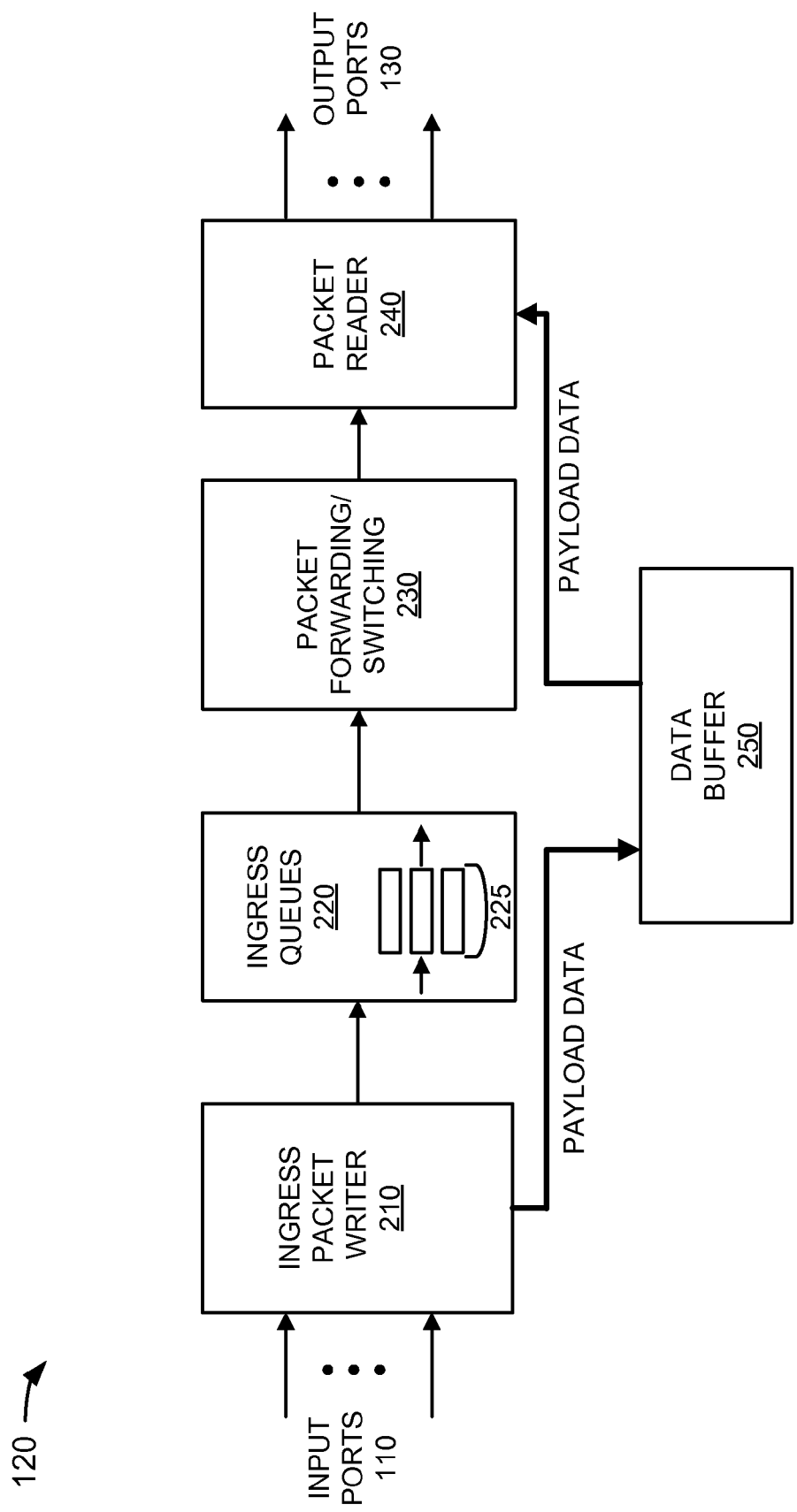
FIG. 2 is a diagram illustrating an example of an implementation of a switching mechanism in the device of FIG. 1.

FIG. 2 is a diagram illustrating an example of an implementation of switching mechanism 120. As shown, switching mechanism 120 may include an ingress packet writer 210, ingress queues 220, a packet forwarding/switching component 230, a packet reader 240, and a data buffer 250. Components of switching mechanism 120, related to fixed latency priority classification, will be particularly described.

Ingress packet writer 210 may receive packets from input ports 110 and separate the control information and payload data of the received packets. In one implementation, ingress packet writer 210 may store the payload data in data buffer 250 and forward the control information of the packet, such as the Ethernet header information, to ingress queues 220. In some implementations, some or all of the control information for a packet may also be stored in data buffer 250. In these implementations, a reference to the packet header control information or select portions of the packet header control information may be forwarded to ingress queues 220.

Ingress packet writer 210 may also be configured to determine, based on the packet header control information, a priority classification for each of the incoming packets. The priority classification may be determined based on a fixed latency technique in which tags in the packet header control information, such as Ethertype tags, may be compressed, in a multi-stage pipeline, to obtain a final key that may be used to lookup the priority classification for the packet. The operation of ingress packet writer 210 is described in more detail below with reference to FIGS. 4-8.

Ingress queues 220 may generally operate to store packet control information, or references to packets, in queues, such as a quantity of first-in first-out (FIFO) queues 225. For example, switching mechanism 120 may be configured to support a quantity of traffic priority classes, such as high priority, standard priority, and best effort (low priority). In one implementation, the priority class for a packet may be specified as a three-bit (eight priority class) value. The particular traffic priority class for a packet may be determined by ingress packet writer 210 and input to one of queues 225 based on the priority class.

Packet forwarding/switching component 230 may operate to read packets or references to packets from queues 225, determine an appropriate output port(s) 130 for the read packets and/or determine new header information for the packets, and forward the packets to packet reader 240. Packet forwarding/switching component 230 may read from queues 225 at a rate based on the priority class corresponding to each of queues 225. For example, packets in a queue corresponding to high priority traffic may be read whenever the queue is not empty while packets in a queue corresponding to best effort traffic may be read whenever the higher priority queues are empty. In determining an appropriate output port(s) 130 for packets, packet forwarding/switching component 230 may use one or more routing or forwarding tables received from control unit 140.

Packet reader 240 may operate to reassemble packets processed by packet forwarding/switching component 230. For example, packet reader 240 may receive new packet header control information from packet forwarding/switching component 230. Packet reader 240 may obtain the corresponding payload data, for the packet header control information, from data buffer 250, and concatenate the packet header control information and the payload data to form a reassembled (whole) packet. Packet reader 240 may forward the reassembled packet to the appropriate output port(s) 130.

Data buffer 250 may include a memory and associated control circuitry for buffering packet data received from ingress packet writer 210. Data buffer 250 may include, for example, high-speed dynamic RAM, static RAM, or another type of memory.

Although FIG. 2 shows example components of switching mechanism 120, in other implementations, switching mechanism 120 may include fewer components, different components, differently arranged components, or additional components than depicted in FIG. 2. Alternatively, or additionally, one or more components of switching mechanism 120 may perform one or more other tasks described as being performed by one or more other components of switching mechanism 120.

As previously mentioned, packets received by device 100 may include packet header control information that may be used by switching mechanism 120 in processing the packet. The packet header control information may include a number of fields, such as Ethertype tags. The tags may be used to determine protocols used by the packet, the priority classification of the packet, virtual LAN (VLAN) information relating to the packet, multi-protocol label switching (MPLS) information relating to the packet, or for other purposes. In some cases, the priority class for a packet may only be determined based on the sequential processing of packet header tags.

Figure 3:
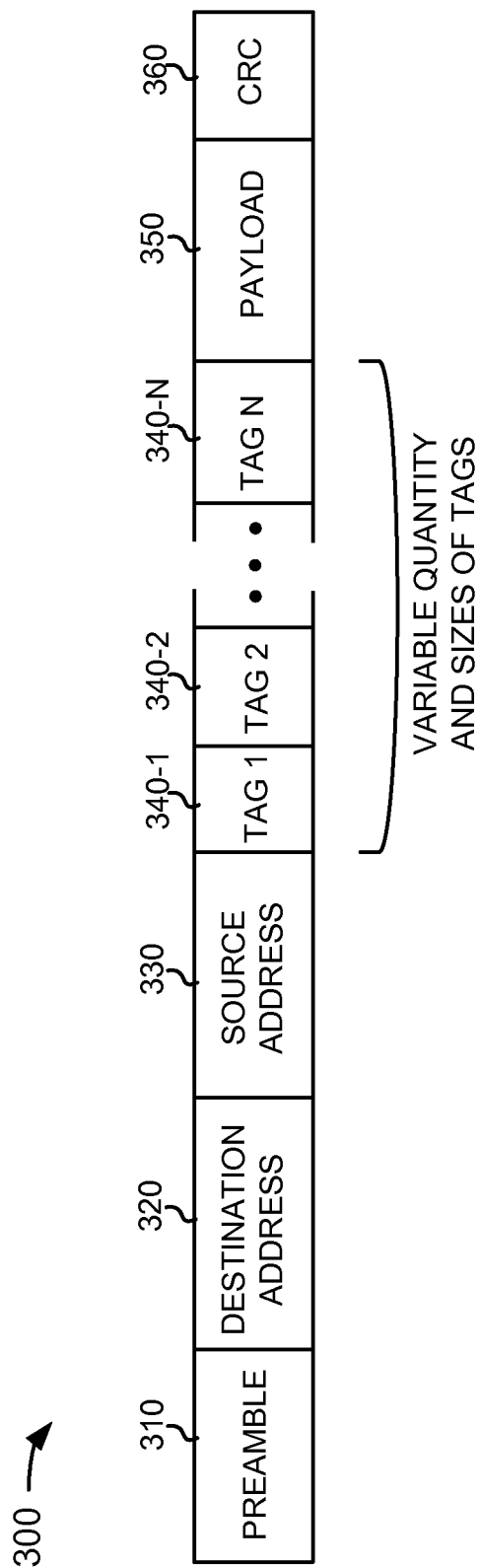
FIG. 3 is a diagram illustrating an example layout of fields in a packet.

FIG. 3 is a diagram illustrating an example layout of fields in a packet 300, such as an Ethernet packet received by ingress packet writer 210. As shown in FIG. 3, packet 300 may contain a number of fields, including: a preamble field 310, a destination field 320, a source field 330, a variable quantity of tags 340-1 through 340-N (referred to collectively as "tags 340" or individually as "tag 340"), payload data 350, and an error check (CRC) field 360. In alternative implementations, other fields or additional fields may be included in packet 300.

Preamble field 310 may include a pattern of bits that allows devices to detect a new incoming packet 300. Preamble field 310 may be, for example, eight octets, where an octet is an eight bit value. Destination field 320 and source field 330 may include destination and source address information for a packet. Destination field 320 and source field 330 may each be, for example, six octets in length and include a media access control (MAC) address.

Tags 340 may include control tags for packet 300. A packet may have a variable number of control tags. Tags 340 may include, for example, Ethertype tags. Tags 340 may include a number of different types of tags, which may indicate different protocols that are encapsulated in packet 300 or priority classes for packet 300. Tags 340 may also include VLAN tags, MPLS tags, or other types of tags. Tags 340 may be of different lengths, depending on the type of the tag. For example, some of tags 320 may be four octet tags while others may be eight or ten octet tags.

Payload data 350 may include the substantive data for packet 300. Error check field 360 may include data that may be used to detect errors within packet 300. For example, error check field 360 may include a 32-bit cyclic redundancy check value.

Figure 4:
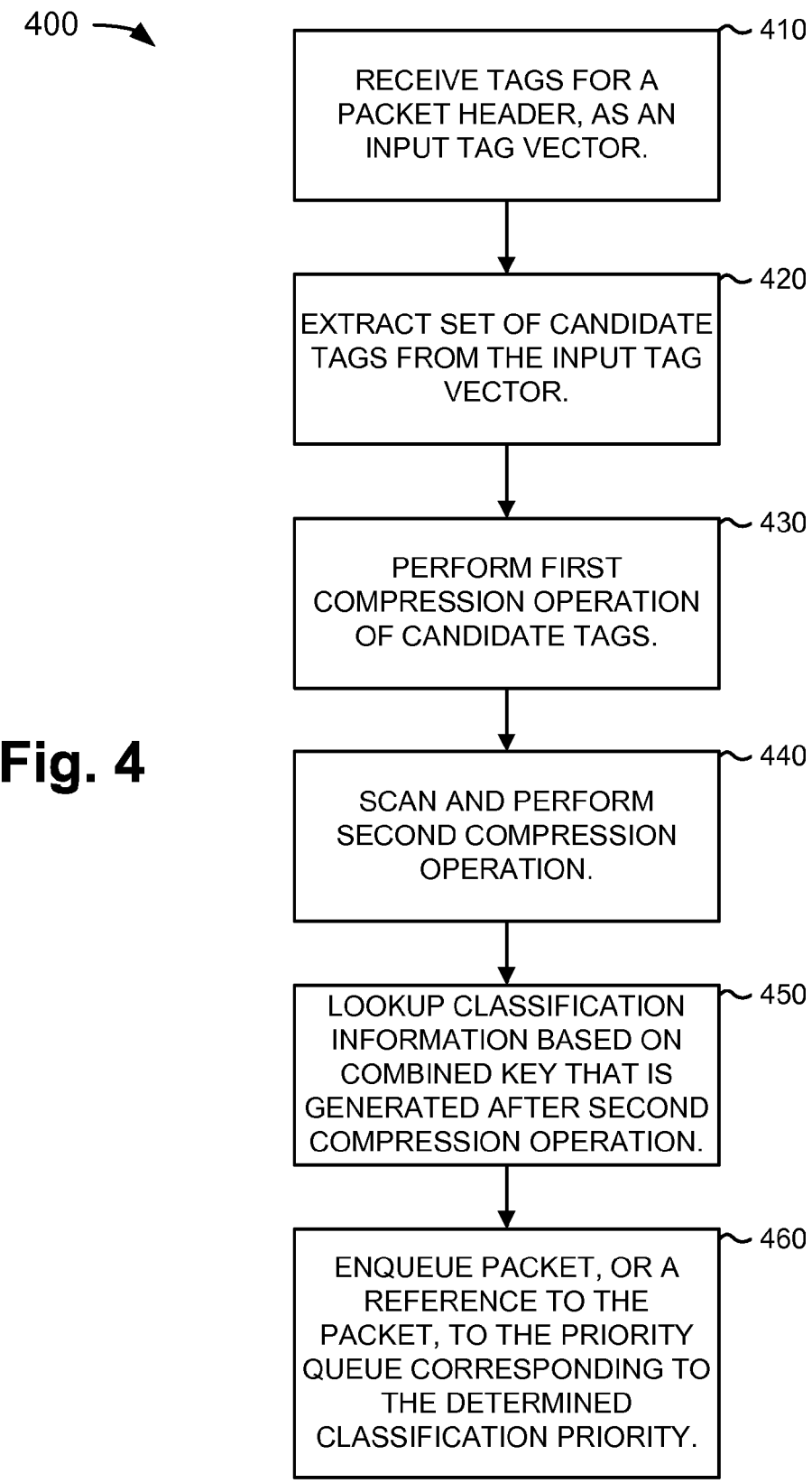
FIG. 4 is a flow chart of an example process for performing a priority class lookup.

FIG. 4 is a flow chart of an example process 400 for performing a priority class lookup. Process 400 may be performed, for example, by ingress packet writer 210. In one implementation, process 400 may be implemented by ingress packet writer 210 using a hardware-based (e.g., implemented as an ASIC, FPGA, etc.) pipeline implementation. The blocks in process 400 may generally correspond to stages in the pipeline.

Process 400 may include receiving tags, as an input tag vector, for a packet header (block 410). Ingress packet writer 210 may, for example, receive a packet at input port 110 and obtain tags 340 (FIG. 3) from the packet. In one implementation, ingress packet writer 210 may operate on a limited portion of tags 340. For example, ingress packet writer 210 may extract the first X octets, where X is an integer, after source address 330 and use this portion of the packet as the input tag vector. For example, X may be chosen as 20, so that the first 20 octets (160 bits) of tags 340 are extracted and used as the input tag vector. As previously mentioned, tags may be of varying length. Accordingly, the received section of tags may, at this point, include an indeterminate quantity of tags, and may conceivably include data after tags 340 (e.g., payload data 350) or may not include all of tags 340 that are in the packet.

Process 400 may further include extracting a set of candidate tags from the input tag vector (block 420). In one implementation, the candidate tags may be extracted, in parallel, as a fixed number of fixed length, non-overlapping, sections of the input tag vector. For example, for a 160 bit tag vector, each candidate tag may be extracted as a two octet (16 bit) section of the tag vector, resulting in ten candidate tags. In another possible implementation, candidate tags may be extracted at every byte offset, resulting in, for a 160 bit tag vector, 20 candidate tags.

Process 400 may further include performing a first compression operation on the candidate tags (block 430). In one implementation, the first compression operation may be based on a lookup operation in which each candidate tag is matched to a pre-selected set of possible matches. The lookup operation may be performed, in parallel, on each candidate tag. As an example of the lookup operation, a flat table lookup, a content addressable memory (CAM) lookup or a ternary CAM (TCAM) lookup may be performed to determine whether each candidate tag matches any of a pre-selected set of possible matches. Each possible match may represent a category that may map to one or more different tag types (called a tag type category herein). The tag type categories may be predetermined as a mapping to tag types that have commonality with respect to priority classification. For example, a tag type that is known to explicitly include priority classification information in a certain bit range may be mapped to a first tag type category. As another example, a tag type that is not related to priority classification may be mapped to another tag type value or may map to a "no-match" value.

As a result of the first compression operation, each candidate tag may be represented by a smaller tag length, which may be referred to a key value herein. In this manner, a compressed version of each candidate tag may be output as the result of the lookup. For example, for 16-bit candidate tags, the lookup may classify each candidate tag into one of 16 possible tag type categories, which may be represented as a four-bit value. Of the 16 possible tag type categories, 15 may represent known tag type categories and one may represent a "no-match" category for a candidate tag that does not fit into any of the 15 known tag type categories. In this example, the ten 16-bit candidate tags (160 bits total) may be compressed to ten four-bit keys (40 bits total). Although this example was given using a compression factor of four (e.g., each 16-bit candidate tag is compressed to a 4-bit value), other compression factors, candidate tag sizes, and key sizes may alternatively be used. In general, if S is the size of the candidate tag identifier and T is the number of possible tag type categories, the compression factor may be expressed as $S/\log_2(T)$.

In addition to the compressed version of each candidate tag (i.e., the key), the lookup operation may also indicate the length of each looked-up candidate tag. For example, a particular candidate tag may be determined to be four, eight, or ten octets in length. For a four octet candidate tag, the next candidate tag may likely be determined to have a key value that indicates no-match, as this candidate tag may be data associated with the four octet candidate tag.

The keys generated in the first compression operation (block 430) may be viewed as a single key vector. Process 400 may further include scanning the key vector and performing a second compression operation (block 440). In one implementation, the key vector may be scanned from left-to-right (i.e., corresponding to the first candidate tag 340-1 to the last candidate tag 304-N). The scanning operation may stop when the first no-match key is encountered, as this may indicate that keys after the no-match key are unreliable. When determining whether a no match is encountered, the length of each key, as determined as part of the first compression operation, may be taken into account. Thus, if a first key, that corresponds to a candidate tag of length four, is determined, the key after the first key may be skipped, as this key, although it may have been compressed to a no-match key, is known to actually be part of the first key.

The second compression operation, performed in block 440, may include converting a particular quantity of the scanned keys, before the first no-match key, into second keys. The second keys may be reduced in size relative to the keys in the key vector generated during the first compression operation. In one implementation, the second compression operation may be based on a lookup operation in which each of the particular number of keys is matched to a pre-selected set of possible matches. As an example of the lookup operation, a flat table lookup, a CAM lookup, or a TCAM lookup may be performed to determine the second key for each of the first keys. Each of the possible matches (keys) may correspond to pre-selected functions or groupings of the candidate tags, such as priority tags, skip tags, inner tags, etc.

In one implementation, the four-bit key values determined in the first compression operation may be further compressed to two-bit values (i.e., four possible groupings). In this implementation, if the particular quantity of scanned keys is chosen as four, four two-bit keys, corresponding to a combined eight-bit value, may remain after the second compression operation.

Process 400 may further include looking-up the classification information for the packet based on the combined key (e.g., the eight-bit key) that was generated in block 440 (block 450). This lookup operation may be performed using a flat table. For an eight-bit combined key, for instance, the table may include 256 ($2^8$) entries. Each entry may correspond to classification information. For some entries, the classification information may indicate a fixed classification. In this case, the packet priority classification may be obtained directly from the table entry. For other entries, the classification information may indicate which of the original candidate tags and potentially, the bit location in that candidate tag, from which the priority class may be extracted. For example, one entry in the table may indicate that the priority class should be obtained as the three bit priority value that is included in bits 10 through 12 of the second candidate tag.

As an alternative implementation to using a single, 256-entry table, as described in the previous paragraph, a separate table may be used based on the number of matches before the first no-match key (as performed in block 440). For example, a separate lookup table may used for zero matches (table length one), one match (table length four), two matches (table length 16), three matches (table length 64) and four matches (table length 256). By having separate tables for the number of matches, the 2-bit key (four possible values) does not have to waste one value on the "no match" value. At a cost of a slightly larger table (256+64+16+1=337 entries) all four of the encoded 2-bit values may have useful meanings.

Process 400 may further include enqueuing the packet, or a reference to the packet, to one of the priority queues 225, corresponding to the determined priority class (block 460). In one implementation, the priority class may be a three-bit (i.e., eight unique values) value which may be directly mapped to eight queues 225. Alternatively, the three-bit priority value may map to fewer than eight queues 225. As an example of this, assume there are three queues 225 and the priority values zero to seven are mapped as follows: priority values zero to two are mapped to the first one of queues 225, priority values three to five are mapped to the second one of queues 225, and priority values six and seven are mapped to the third one of queues 225.

Figure 5:
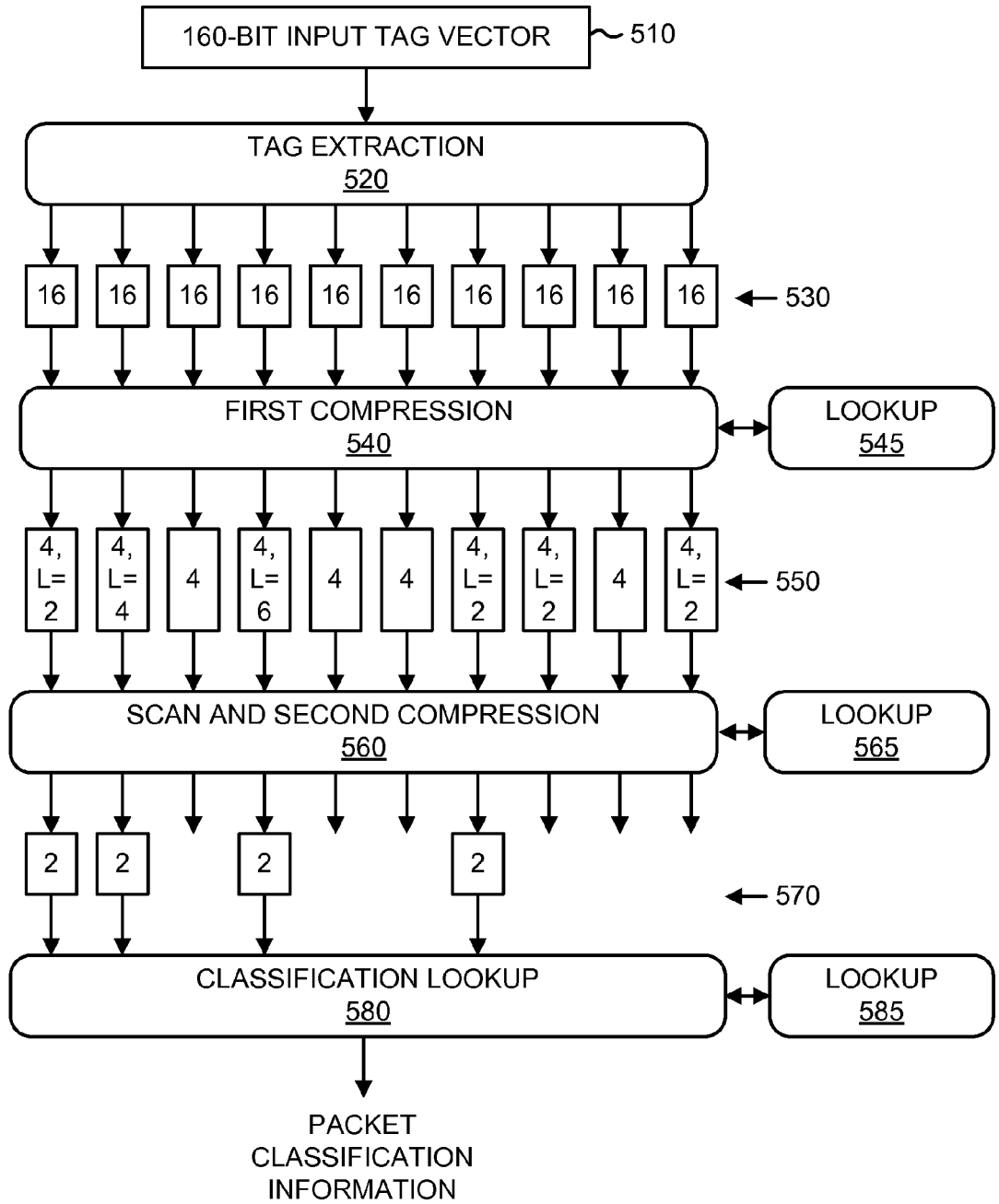
FIG. 5 is a diagram conceptually illustrating an example of an implementation of the process shown in FIG. 4.

FIG. 5 is a diagram conceptually illustrating an example of an implementation of the process shown in FIG. 4. In the example of FIG. 5, the input tag vector will be extracted as a 160-bit value, the candidate tags will be described as being 16-bit tags, the first compression operation will compress the candidate tags to four-bit keys, and the second compression operation will compress the four-bit keys to a maximum of four two-bit keys. In other implementations, other values for these parameters may be chosen. Further, the implementation of FIG. 5 is illustrated as a pipeline of processing elements, such as hardware or software processing elements. Processing elements of the pipeline are illustrated as rectangles with rounded corners and data flow through the pipeline is illustrated as rectangles with square corners.

In FIG. 5, a number of pipeline stages are illustrated as: a tag extraction component 520, a first compression component 540, a scan and second compression component 560, and a classification lookup component 580. The components may operate in a pipeline fashion such that, for example, while classification lookup component 580 operates on one packet, scan and second compression component 560 may be operating on a second packet, while first compression component 540 may be operating on yet a third packet, etc.

160-bit input tag vector 510 may be received by tag extraction component 520. Tag extraction component 520 may break the input tag vector 510 into a series of 16-bit values, which may each represent a candidate tag 530. Each candidate tag 530 is illustrated in FIG. 5 as a rectangle that includes the number 16, indicating that the candidate tag 530 is 16-bits in length. Ten candidate tags 530, representing the entirety of the 160-bit input tag vector 510, are illustrated.

First compression component 540 may receive candidate tags 530. First compression component 540 may, in parallel, perform the first compression operation on each of candidate tags 530. The first compression operation may involve a lookup operation, such as a lookup operation performed using a lookup component 545. Lookup component 545 may include, for example, a flat table lookup, a CAM, or a TCAM. In one implementation, lookup component 545 may be duplicated for each of the ten candidate tags 530.

Figure 6:
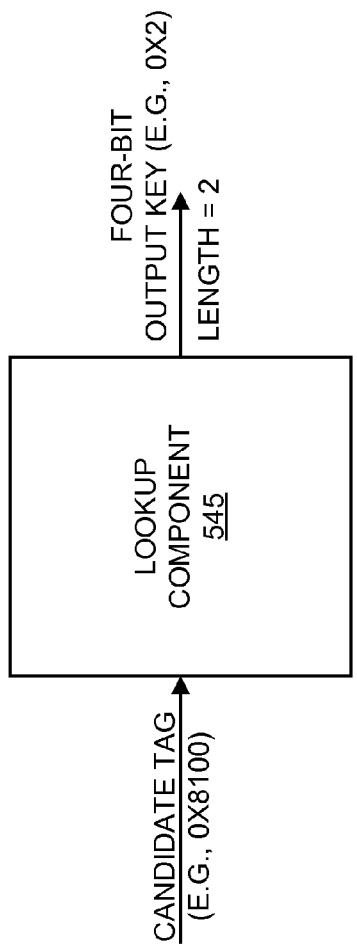
FIG. 6 is a diagram conceptually illustrating an example of a lookup component.

FIG. 6 is a diagram conceptually illustrating an example of lookup component 545. In this implementation, lookup component 545 may operate to match the 16-bit input candidate tag to one of 16 possible matches. The 16 possible matches may be represented by a four-bit key value. Alternatively, or additionally, lookup component 545 may receive input values longer or shorter than 16 bits and may generate output key values that are longer or shorter than four bits.

As shown, lookup component 545 may receive a candidate tag and match the candidate tag (e.g., the hexadecimal candidate tag 8100) using a lookup table, a CAM, a TCAM, or another structure, to obtain an output key (e.g., hexadecimal value 2). At least one of the output keys may be a no-match key that is used to indicate that input candidate tag did not match a value in lookup component 545.

Additionally, a length of the candidate tag may also be determined by lookup component 545. Alternatively, the output key may be further used to lookup the length of the candidate tag. In FIG. 6, the example length output value is shown as two, potentially indicating that the candidate tag has a length of two octets. In this example, the candidate tag is entirely represented by the input candidate tag to lookup component 545. Other length values, such as a length of four or six octets, may indicate that the candidate tag continues into later received candidate tags 530.

Referring back to FIG. 5, ten keys 550 may be output from first compression component 540. Each key 550 may indicate the length of the key (4 bits) and the length of the corresponding candidate tag 530. For instance, the first key 550 may be associated with a candidate tag having a length of two octets (L=2) and the second key 550 may be associated with a candidate tag having a length of four octets (L=4). The third key 550 may include information that is actually part of the candidate tag corresponding to the second key 550. Accordingly, this key is likely to be determined as the key corresponding to the no-match category and may thus have an unspecified length.

The ten keys 550, output from first compression component 540, may be input to scan and second compression component 560. Scan and second compression component 560 may scan keys 550 to locate a particular quantity (e.g., up to the first four) of keys 550 that are not no-match keys. Scan and second compression component 560 may select these keys for compression. Scan and second compression component 560 may take into account the lengths, of the corresponding candidate tags, as determined by first compression component 540. Thus, in the illustrated example, the first and second of keys 550 may be selected by scan and second compression component 550. The third key 550, however, may not be selected, as this key may be part of the candidate tag corresponding to the second key. Similarly, the fourth and seventh of keys 550 may be selected by scan and second compression component 560.

Scan and second compression component 560 may perform a second compression operation on the selected ones of keys 550. The second compression operation may involve a lookup operation, such as a look up operation performed with a lookup component 565. Lookup component 565 may include, for example, a flat table lookup, a CAM, or a TCAM. In one implementation, lookup component 565 may be duplicated for each of the ten potential keys 550, which may be input to scan and second compression component 560.

Figure 7:
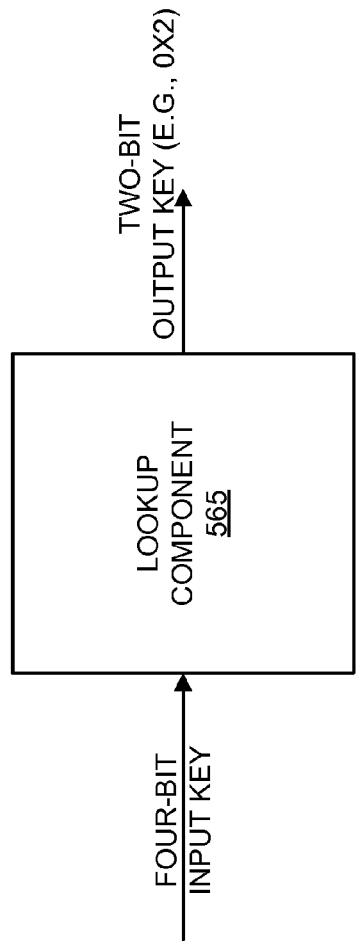
FIG. 7 is a diagram conceptually illustrating another example of a lookup component.

FIG. 7 is a diagram conceptually illustrating an example implementation of lookup component 565. In this implementation, lookup component 565 may operate to match the four-bit input keys 550 to one of four possible matches. Each of the four possible matches may generally be selected to correspond to a grouping of the functionality of the corresponding candidate tag 530. For example, the matches may be selected to define a group of tags related to priority, a group of tags that should be skipped for purposes of priority classification, a group of tags that do not directly include priority information that affect the priority provided by subsequent tags, or other groupings based on tag functionality. The four possible matches may be represented by a two-bit key value. Alternatively, or additionally, lookup component 565 may receive input values longer or shorter than four bits and may generate output key values that are longer or shorter than two bits. As shown in FIG. 7, lookup component 565 may receive four-bit key and match the key to a lookup table, a CAM, a TCAM, or another structure, to obtain the two-bit output key.

Referring back to FIG. 5, four (or fewer) keys 570, each two bits in length, may be output from scan and second compression component 560. When interpreted as a single vector, keys 570 may be used as a final lookup key to determine the priority classification of the packet.

Classification lookup component 580 may receive keys 570. Classification lookup component 580 may implement, for example, a lookup component 585 that is indexed using an eight-bit key, such as the single vector defined by the four keys 570. In an alternative implementation, classification lookup component 580 may include a number of lookup tables, in which each lookup table corresponds to a key of a particular length (e.g., a one-entry lookup table for zero matches, a four-entry table for one match, a 16-entry table for two matches, a 64-entry table for three matches, and a 256-entry table for four matches). Each entry in the lookup table may include a priority class for the packet, such as a three-bit class value, or classification information indicating how to derive the priority class from candidate tags 530. For example, the classification information may indicate that the priority class should be obtained from a particular one of candidate tags 530 and from a particular location in the particular candidate tag.

Figure 8:
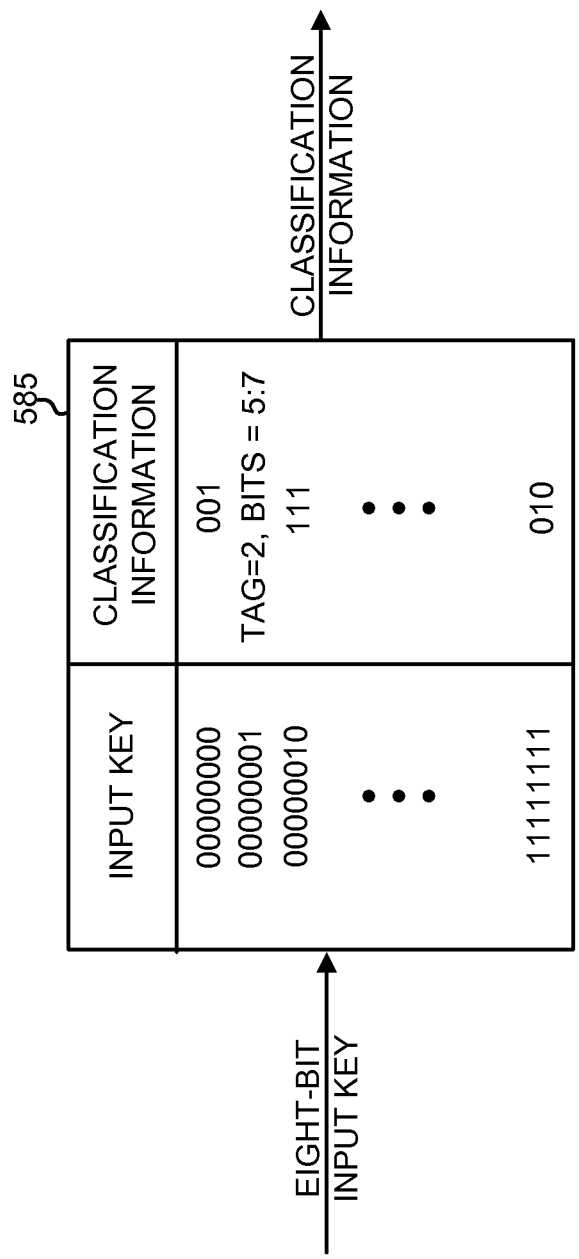
FIG. 8 is a diagram conceptually illustrating still another example of a lookup component.

FIG. 8 is a diagram conceptually illustrating an example implementation of lookup component 585. In this implementation, lookup component 585 may be a flat lookup table and may operate to match an eight-bit input key to classification information. Lookup component 585 may include 256 entries and the input key may be used to directly access one of the entries to obtain the classification information.

As shown in FIG. 8, the first entry, which may correspond to an input key having a value of zero (shown as binary 00000000), may include classification information indicating a priority class value of one (shown as binary 001). In this situation, lookup table 585 may directly specify the priority class. For some entries, however, such as the second entry, which may correspond to an input key having a value of one (shown as binary 00000001), the classification information may indicate how the priority class can be obtained. In this example, the classification information (TAG=2, BITS=5:7) may indicate that the priority class should be extracted from bits five through seven of the second candidate tag. Other formats could alternatively be used to specify the priority class.

Fixed latency priority classification, as described above, may be implemented by determining a packet's priority class through a number of relatively constant-time lookup operations. The priority classification may be implemented using a pipeline structure to achieve high throughput.

The foregoing description of implementations provides illustration and description, but is not intended to be exhaustive or to limit the implementations to the precise form disclosed. Modifications and variations are possible in light of the above teachings or may be acquired from practice of the invention.

For example, while a series of blocks has been described with regard to FIG. 4, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a processor to:
   extract a sequence of values from a header portion of a packet;
   compress the sequence of values to obtain a plurality of keys;
   compress the plurality of keys;
   determine a priority class for the packet based the compressed plurality of keys; and
   write the packet or a reference to the packet to a selected priority queue of a plurality of priority queues,
   the priority queue being selected based on the determined priority class.

2. The device of claim 1, where, when extracting the sequence of values, the processor is to:
   extract a group of tags from the header portion of the packet,
   the group of tags being extracted as the sequence of values.

3. The device of claim 1, where, when compressing the sequence of values, the processor is to:
   compress a first value, of the sequence of values, in parallel with a second value of the sequence of values.

4. The device of claim 1, where the plurality of keys comprises a first plurality of keys;
   where, when compressing the plurality of keys, the processor is to:
   compress the first plurality of keys to obtain a second plurality of keys, and
   concatenate a quantity of the second plurality of keys to obtain a final key; and
   where, when determining the priority class, the processor is to:
   determine the priority class based on the final key.

5. The device of claim 4, where, when concatenating the quantity of the second plurality of keys, the processor is to:
   identify a key, of the first plurality of keys, that corresponds to a value, of the sequence of values, that did not include a matching value in a look-up table used to compress the sequence of values, and
   determine the quantity of the second plurality of keys based on the identified key.

6. The device of claim 1, where, when determining the priority class, the processor is to:
   determine the priority class for the packet based on a length of a group of keys included in the plurality of keys.

7. The device of claim 1, where, when compressing the sequence of values, the processor is to:
   compress the sequence of values using one of:
   a flat table,
   a content addressable memory, or
   a ternary content addressable memory.

8. A method comprising:
   extracting, by a device, a sequence of values from a header portion of a packet;
   compressing, by the device, the sequence of values to obtain a plurality of keys;
   compressing, by the device, the plurality of keys;
   determining, by the device, a priority class for the packet based on the compressed plurality of keys; and
   writing, by the device, the packet or a reference to the packet to a selected priority queue of a plurality of priority queues,
   the priority queue being selected based on the determined priority class.

9. The method of claim 8, where the extracting the sequence of values includes:
   extracting a particular quantity of octets of data from the header portion of the packet, and
   extracting the sequence of values from the particular quantity of the octets of data.

10. The method of claim 9, where the extracting the particular quantity of the octets of data includes:
    extracting, from the packet, the particular quantity of the octets of data that are adjacent to a source address included in the header portion of the packet.

11. The method of claim 8, where the extracting the sequence of values includes:
    extracting, in parallel, a quantity of fixed length and non-overlapping sections of the header portion of the packet to obtain the sequence of values.

12. The method of claim 8, where the extracting the sequence of values includes:
    extracting each value, of the sequence of values, at a respective byte offset.

13. The method of claim of claim 8, where the compressing the sequence of values includes:
    determining, for each value, of the sequence of values, a category of a control tag associated with each value, and
    compressing the sequence of values based on the category of the control tag associated with each value.

14. The method of claim 8, where the compressing the plurality of keys includes:
    determining, based on compressing the sequence of values, a length of each key of the plurality of keys, and
    compressing, based on the length of each key, the plurality of keys.

15. A non-transitory computer-readable medium storing instructions, the instructions comprising:
    one or more instructions that, when executed by a processor, cause the processor to:
        extract a sequence of values from a header portion of a packet;
        compress the sequence of values to obtain a plurality of keys;
        compress the plurality of keys;
        determine a priority class for the packet based the compressed plurality of keys; and
        write the packet or a reference to the packet to a selected priority queue of a plurality of priority queues,
            the priority queue being selected based on the determined priority class.

16. The non-transitory computer-readable medium of claim 15, where the one or more instructions to determine the priority class include:
    one or more instructions that, when executed by the processor, cause the processor to:
        determine, using a flat table, classification information for the packet based on the compressed plurality of keys,
            the flat table including a quantity of entries,
                the quantity of entries corresponding to a size of the compressed plurality of keys, and
        determine, based on the classification information, the priority class for the packet.

17. The non-transitory computer-readable medium of claim 15, where the one or more instructions to extract the sequence of values include:
    one or more instructions that, when executed by the processor, cause the processor to:
        extract, from the header portion of the packet, a particular quantity of bits following a source address included in the header portion of the packet.

18. The non-transitory computer-readable medium of claim 15, where the one or more instructions to compress the sequence of values include:
    one or more instructions that, when executed by the processor, cause the processor to:
        compress the sequence of values using one of:
            a flat table,
            a content addressable memory, or
            a ternary content addressable memory.

19. The non-transitory computer-readable medium of claim 15, where the one or more instructions to compress the sequence of values include:
    one or more instructions that, when executed by the processor, cause the processor to:
        perform a first look-up operation to compress a first value, of the sequence of values, in parallel with performing a second look-up operation to compress a second value of the sequence of values.

20. The non-transitory computer-readable medium of claim 15, where the plurality of keys comprises a first plurality of keys,
    where the one or more instructions to compress the plurality of keys include:
        one or more instructions that, when executed by the processor, cause the processor to:
            compress the first plurality of keys to obtain a second plurality of keys,
            identify a key, of the first plurality of keys, that corresponds to a value, of the sequence of values, that did not include a matching value in a look-up table used to compress the sequence of values,
            determine a quantity of the second plurality of keys based on the identified key, and
            concatenate the quantity of the second plurality of keys to generate a final key; and
    where the one or more instructions to determine the priority class include:
        one or more instructions that, when executed by the processor, cause the processor to:
            determine the priority class for the packet based on the final key.

* * * * *